United States Patent
Burgard et al.

(10) Patent No.: US 7,323,121 B2
(45) Date of Patent: Jan. 29, 2008

(54) COATING MATERIAL

(75) Inventors: Detlef Burgard, Völklingen (DE); Rüdiger Nass, Riegelsberg (DE)

(73) Assignee: Air Products and Chemicals, Inc., Allentown, PA (US)

( * ) Notice: Subject to any disclaimer, the term of this patent is extended or adjusted under 35 U.S.C. 154(b) by 42 days.

(21) Appl. No.: 10/518,891

(22) PCT Filed: Jun. 24, 2003

(86) PCT No.: PCT/DE03/02107

§ 371 (c)(1),
(2), (4) Date: Jan. 24, 2005

(87) PCT Pub. No.: WO04/000954

PCT Pub. Date: Dec. 31, 2003

(65) Prior Publication Data

US 2005/0227107 A1    Oct. 13, 2005

(30) Foreign Application Priority Data

Jun. 24, 2002  (DE)  ............................ 102 28 204
Jun. 26, 2002  (DE)  ............................ 102 28 626

(51) Int. Cl.
*H01B 1/02*    (2006.01)
*H01B 1/06*    (2006.01)

(52) U.S. Cl. .............................. 252/520.1; 252/521.3; 977/811

(58) Field of Classification Search ................ 252/500, 252/520.1, 521.3; 977/811
See application file for complete search history.

(56) References Cited

U.S. PATENT DOCUMENTS 5,504,133 A    4/1996  Murouchi et al.
5,518,810 A *  5/1996  Nishihara et al. ............ 428/328
5,529,720 A *  6/1996  Hayashi et al. ........... 252/519.3
6,261,684 B1   7/2001  Takahashi et al.
6,368,470 B1   4/2002  Woodard ............... 204/192.27
6,533,966 B1   3/2003  Nonninger et al.
6,599,631 B2   7/2003  Kambe et al.
6,881,357 B2 * 4/2005  Lee et al. .................... 252/511
2002/0039651 A1  4/2002  Murata

FOREIGN PATENT DOCUMENTS

| DE | 44 35 376 | 4/1995 |
| EP | 0 604 969 | 6/1994 |
| EP | 0 604 969 | 7/1994 |
| EP | 0 727 306 | 8/1996 |
| EP | 1 008 564 | 6/2000 |
| EP | 1 040 913 | 10/2000 |
| JP | 01290527 A | * 11/1989 |
| JP | 5-201731 | 8/1993 |
| JP | 6-232586 | 8/1994 |
| JP | 6-238853 | 8/1994 |
| JP | 7-242842 | 9/1995 |
| JP | 7-242844 | 9/1995 |
| JP | 7-315881 | 12/1995 |
| JP | 2000-003618 | * 1/2000 |
| WO | WO 00/14017 | 3/2000 |

OTHER PUBLICATIONS

U.S. Appl. No. 10/499,734, filed Aug. 9, 2004, Burgard, et al.

* cited by examiner

*Primary Examiner*—Lorna M. Douyon
*Assistant Examiner*—Jaison Thomas

(57) ABSTRACT

The invention relates to a conductive infrared-absorbing coating material consisting of indium tin oxide. According to the invention, said coating material has a yellow index of above 15.

10 Claims, 3 Drawing Sheets

COATING MATERIAL

FIELD OF THE INVENTION

The present invention relates to conductive nanoparticles with improved properties and transparent coatings made of the same.

BACKGROUND OF THE INVENTION

Transparent conductive coatings are of great significance and are well known among other things for displays (e.g., CRT, LCD, and OLED) and/or antistatic coatings. Standard methods for manufacturing comprise among others first the gas phase coating (e.g., sputtering, CVD, PVC) of flat glass with thin, conductive coatings that are transparent in the visible world. Metals (e.g., precious metals), conducting or semi-conducting doped oxides such as ATO ($SnO_2$:SB), FTO ($SnO_2$:Sb), FFO ($SnO_2$F), AZO (ZnO:A1) or ITO ($In_2O_3$:Sn) are used as coating materials. As a rule thick coatings are obtained via these methods. This is known as the standard method for coating flat glass in order to generate high-quality coatings.

The sputter facilities that are used for glass coating are quite expensive (2 to 3-figure million amounts) and work profitably only in the case of large operational capacity (coating of several 100 T $m^2$/a). In addition, such facilities require high material consumption; because when either the material that is to be deposited or a target are vaporized, the vaporized material is only partially deposited on the substrate to be coated, while the rest settles somewhere in the interior of the machine. Further, such facilities are inflexible, such that small or special runs are impractical since only flat geometries can be coated using sputter facilities. Other geometries are only possible to a limited extent and the corresponding facility must be rebuilt with each change of geometry. This is somewhat of a problem for automobile glazing, because there are no absolutely flat automobile panes. Sputtering flat panes and then bending them has not succeeded up to this point. Even coating of polymers and films is only possible to a limited extent.

There have also been approaches for realizing such coatings via using conductive nanoparticies (e.g. ITO). Such methods exhibit advantages as a simple coating technique (e.g. via wet-chemical methods such as painting, spraying, pressing, dipping, and spin-coating), thereby permitting: (i) the direct application of coatings onto structures, (ii) a low technical expense with correspondingly low investment costs as a consequence, (iii) are geometry independent, (iv) make better use of the material, (v) have greater flexibility, and (vi) permit a coating of polymers and films.

One basic requirement is the availability of, for example, IT nanopowder suitable particle size and the redispersibility with the corresponding properties. It is known from U.S. Pat. No. 5,518,810 (Mitsubishi) that a specific shade of color correlates with optimum properties (e.g., infrared shielding). Typically blue is an indication of a high number of oxygen defects, thus a high charge carrier density, which is caused by oxygen defects. This is, as a rule, generated in ITO by annealing the powder or coatings of the powder under inert gas or reducing atmosphere, Specifically in the case of temperatures above 250° C., process results in blue powder having a higher conductivity than yellow powder that has not been retreated under reducing atmosphere, and this process results in coatings that have been reduced (e.g., by heat treatment at 500° C. in the air after inert gas/reducing treatment at temperatures above 250° C. show significantly higher conductivities). A subsequent temperature treatment of ITO coatings under reducing/inert atmosphere at temperatures above 250° C. is state of the art. However, with many technical applications such a subsequent treatment is often not desirable or not possible, since the coated objects are destroyed at the required temperature (e.g., with CRT or conductive and/or antistatic coatings on plastic). At the same time, however, the requirements and the need for highly conductive, transparent coatings on plastic are also increasing.

The object of the present invention relates to making something new available for industrial application.

The solution of this task will be claimed in independent form.

DETAILED DESCRIPTION

Figure 1:
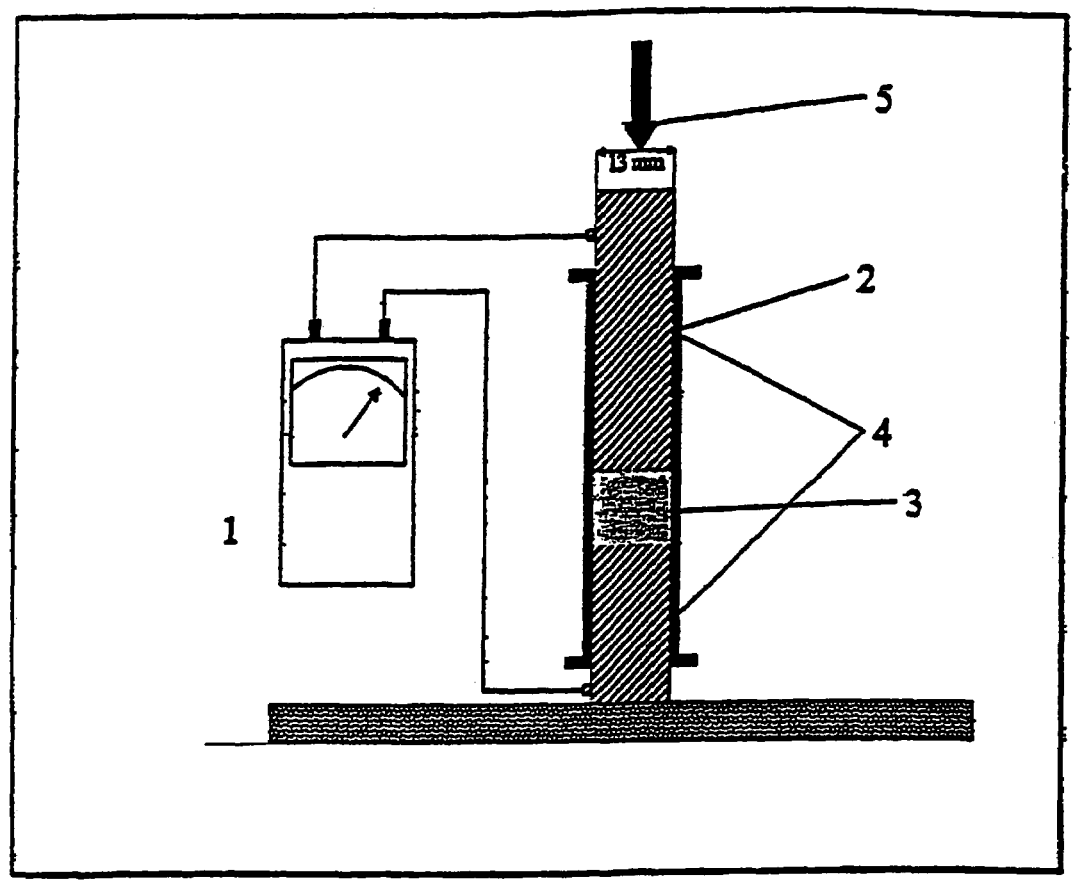
FIG. 1 is a drawing of the apparatus used for making conductivity measurements.
Figure 2:
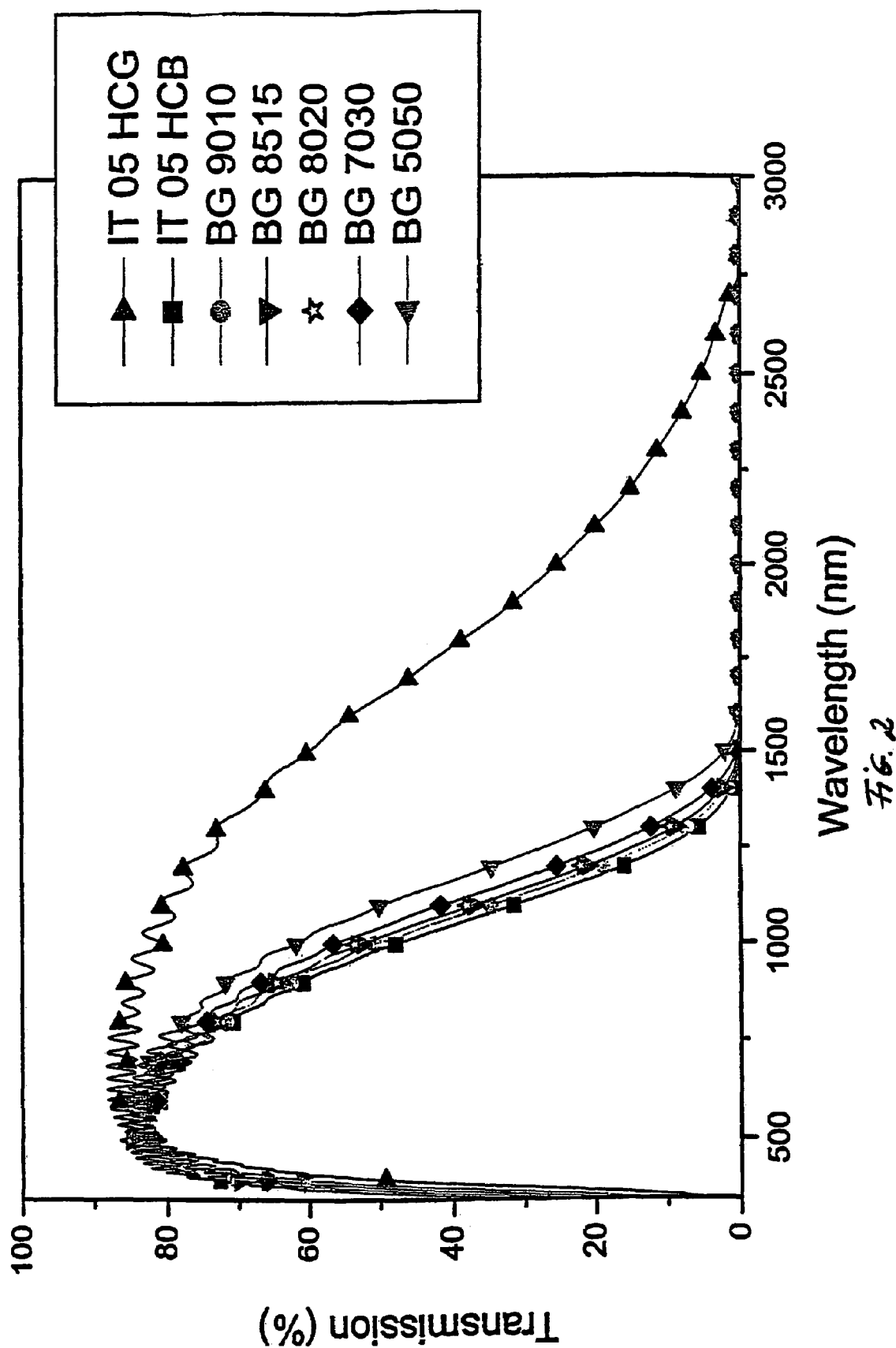
FIG. 2 is a graph showing the transmission of the inventive powders.
Figure 3:
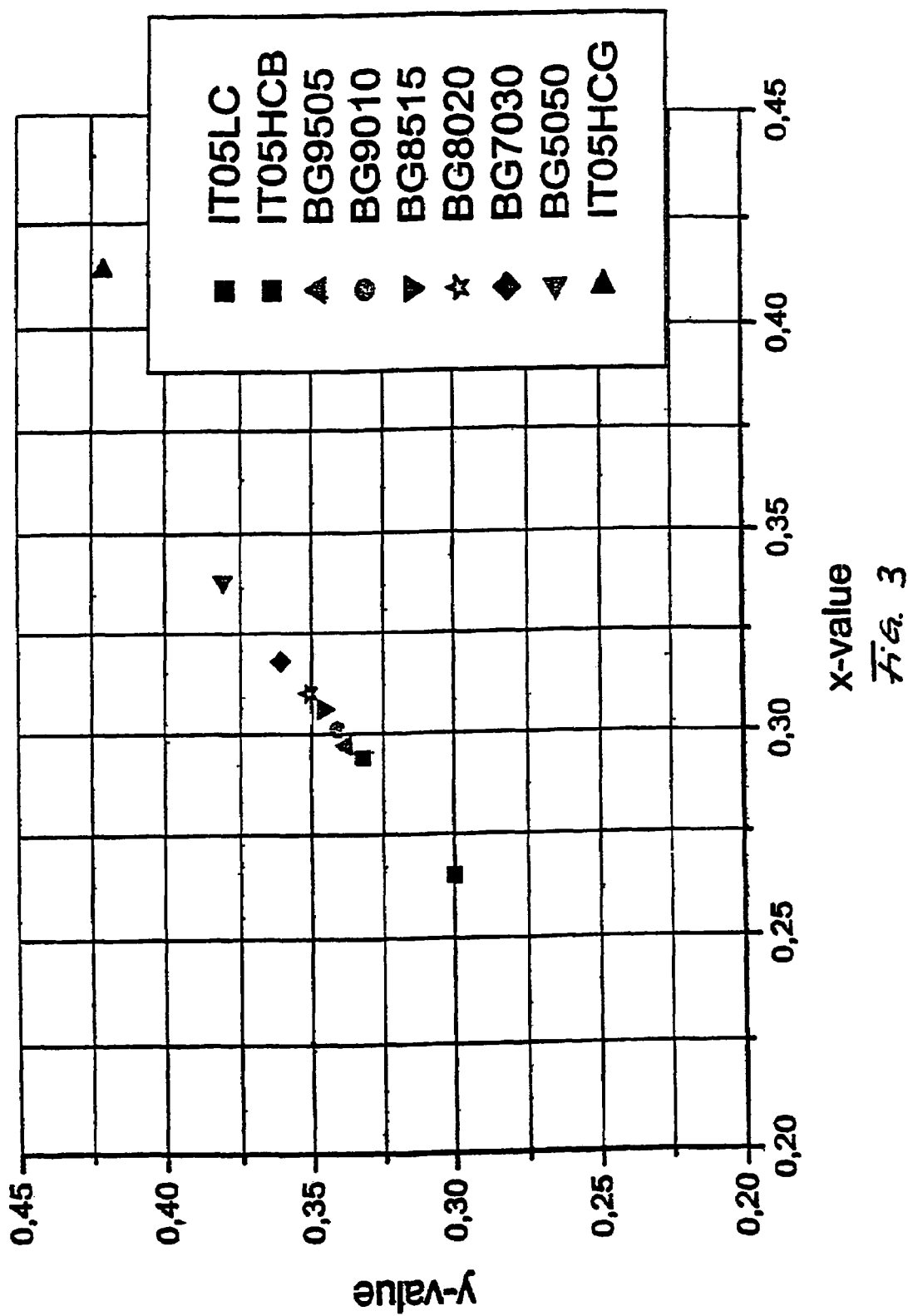
FIG. 3 is a graph showing the conductivity of the inventive powders.

Consequently, in accordance with the invention an improvement results in the conductivity of coatings which contain ITO nanoparticles, with a simultaneous higher transparency in the visible world with a simple coating technique. Examples of such techniques comprise wet-chemical methods (e.g., painting, spraying, pressing, dipping, and spin-coating) among other techniques with lower technical expenses and lower investment costs.

The better conductivity obtained by the inventive process opens up new fields of application and allows less material (ITO) to be employed for the same conductivity, which leads to more favorable end products. Typically it should be assumed that, when for example coatings are produced, which consist of conductive starting powders and/or in which conductive particles are integrated in a matrix, the conductivity of these coatings will be higher, the higher the conductivity of the starting powders or particles is. However, the invention has recognized that coatings with better conductivity can be produced from yellow powder with actually poorer conductivity than can be produced from blue powder, which as such exhibits a higher conductivity. This will be illustrated by the following examples.

EXAMPLES

Example 1

Yellow ITO Powder is Produced in the Following Manner:

Nanocrystalline $In_2O_3$/$SnO_2$ (ITO) powders are produced from an aqueous solution by means of a coprecipitation process in which soluble In or Sn components are precipitated by pH value increase. In this example the concentrations of these compounds were selected in such a way that the Sn concentration amounted to S at. % relative to In. However, in principle the Sn concentration can be arbitrarily adjusted. After separation of the reaction product it is dried and annealed at 300° C. under normal atmosphere for 1 hour for the purpose of setting the crystalline phase. Then the crystalline $In_2O_3$/$SnO_2$ is divided into different samples and the individual samples are after-annealed for different periods of time under forming gas at 300 C. (see Table 1).

Powders with color indexes that range between the maximum values listed in Table 1 (IT-05 HCB and IT-05 HCG) as well as coatings with yellow indexes between the corresponding values from Table 1 can also be obtained by mixtures of the various powders.

TABLE 1

| Sample Name | Duration of treatment | Color index | Yellow index |
|---|---|---|---|
| IT-05 HCB | 1.5 hour | X = 0.294, y = 0.332 | 0.12 |
| BG9010 | 1 hour | X = 0.301, y = 0.341 | 1.17 |
| BG8515 | 50 min | X = 0.306, y = 0.346 | 2.97 |
| BG8020 | 45 min | X = 0.310, y = 0.351 | 4.63 |
| BG7030 | 40 min | X = 0.318, y = 0.361 | 6.4 |
| BG5050 | 30 min | X = 0.338, y = 0.381 | 12.66 |
| IT-05 GN | 1 hour, $N_2$ | X = 0.404, y = 0.418 | 22.7 |
| IT-05 HCG | — | X = 0.414, y = 0.421 | 23.8 |

Dispersion coatings containing yellow ITO powder were prepared, with an organic binder by means of spin-coating, and the coatings were dried at 120° C. for 1 hours. The resulting coating thickness and obtained transparent composite coatings amounted to 3 μm. The conductivity of the coating with blue powder amounted to 1.8 kOhm/square. The conductivity of the coating of yellow powder was 0.8 kOhm/square. The yellow index of both coatings was measured with a color pen (Dr. Lange) and evaluated in accordance with DIN 6167 and ASTM D 1925 (standard illuminant C; standard viewer 2°). While the yellow index of the coating of blue powder was below 0.1, the yellow index of the coating made of yellow powder was 23.8.

Example 2

Transparent coatings containing yellow ITO powder and blue ITO powder were prepared by means of spin-coating on the front plate of a kinescope (CRT). The coating had thickness of 100 nm. After a brief period of drying at room temperature, in order to protect the ITO coating from scratching it was post-coated with a solution of a hydrolysable Si alcholate by means of spin-coating. The double-coated substrate was heated for 30 minutes at 180° C. After cooling off, the conductivity of the two-coat system is 8.5 kΩ for the blue powder and 6.1Ω for the yellow powder. The surface resistances of the coatings were determined using a 4 point conductivity meter (Loresta GP, Mitsubishi Chemical Corporation).

In the measurements the conductivity of the powders was determined with the arrangement of measuring instruments outlined in FIG. 1. Referring now to FIG. 1, this arrangement of measuring instruments for determination of the conductivity of the powders shows a measuring instrument (multimeter) with reference number 1, a glass pipe with reference number 2, powder with reference number 3, with reference number 4 an extrusion press ram made of steel and with 5 indicates applied pressure.

The measuring instrument described in FIG. 1 was filled with 3.3 g each of powder. Then the upper ram was introduced and contacted with the measuring instrument. The upper ram was then weighted with the various weights and the resulting resistance was measured via the compressed powder charge using a commercial multimeter. The measurements resulted in the following readings:

| | | Resistance (Ohm) | |
|---|---|---|---|
| Weight (kg) | Pressure (kPa) | Blue powder | Yellow powder |
| 1 | 77 | 42 | 1140 |
| 1.5 | 115 | 32 | 820 |
| 1.8 | 138 | 28 | 640 |

The color values of the powders were as follows:
Blue: x=0.294; Y=0.332
Yellow: x=0.414; Y=0.421

The characterization of the powders takes place via conductivity and shade of color, the characterization of the coatings takes place via yellow index and conductivity.

The invention claimed is:

1. An annealed, conductive, infrared-absorbing composition comprising particles of indium tin oxide having a color index in terms of x and y wherein x is 0.404 to 0.414 and y is 0.418 to 0.421, and a resistance of less than about 42 Ohm when measured at a pressure of 77 kPa.

2. A coating comprising the conductive particles of claim 1.

3. The composition of claim 1 wherein the particles comprise nanocrystalline In2O3/SnO2.

4. The coating of claim 2 wherein the coating is transparent.

5. The coating of claim 2 further comprising a second coating.

6. The coating of claim 5 wherein the second coating comprises hydrolysable Si alcholate.

7. The coating of claim 2 wherein said coating is applied upon at least one of glass and plastic.

8. A conductive nanoparticle composition comprising indium tin oxide and having a color index in terms of x and y wherein x is 0.404 to 0.414 and y is 0.418 to 0.421 wherein the nanoparticle composition is produced by a process comprising:
   preparing an aqueous solution comprising water, and water soluble indium and tin compounds,
   increasing the pH of the solution thereby forming a precipitate,
   drying the precipitate,
   annealing the dried precipitate, and;
   exposing the annealed dried precipitate to forming gas.

9. The composition of claim 8 having a resistance of less than 1140 Ohm.

10. A conductive composition comprising particles of indium tin oxide having color index in terms of x and y wherein x is 0.404 to 0.414 and y is 0.418 to 0.421, and a resistance of less than about 1140 Ohm when measured at a pressure of 77 kPa.

* * * * *